(12) United States Patent
Smith et al.

(10) Patent No.: US 12,530,590 B2
(45) Date of Patent: Jan. 20, 2026

(54) METHOD AND AN APPARATUS FOR FUNCTIONAL MODEL GENERATION

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 29 days.

(21) Appl. No.: 18/142,819

(22) Filed: May 3, 2023

(65) Prior Publication Data

US 2024/0370732 A1 Nov. 7, 2024

(51) Int. Cl.
*G06N 3/09* (2023.01)

(52) U.S. Cl.
CPC .................... *G06N 3/09* (2023.01)

(58) Field of Classification Search
CPC ... G06N 3/09; G06T 7/80; G06T 7/20; H04H 7/181
See application file for complete search history.

(56) References Cited

U.S. PATENT DOCUMENTS

| 10,095,990 | B2 | 10/2018 | Farooq |
| 10,157,347 | B1* | 12/2018 | Kasturi ............... G06F 16/3326 |
| 2013/0212508 | A1* | 8/2013 | Barsoum ............... G06Q 10/10 715/771 |
| 2017/0193420 | A1 | 7/2017 | Tiwari |
| 2019/0251475 | A1* | 8/2019 | Reddy ............ G06Q 10/06393 |
| 2021/0011648 | A1* | 1/2021 | Reineke ................ G06F 3/0605 |
| 2021/0042767 | A1* | 2/2021 | Guan ................. G06Q 30/0255 |
| 2021/0304360 | A1* | 9/2021 | al-Salem ............. G06V 10/772 |
| 2021/0373985 | A1* | 12/2021 | Gadepalli ............. G06F 11/008 |
| 2022/0005332 | A1* | 1/2022 | Metzler ............. G08B 13/1965 |
| 2022/0067109 | A1* | 3/2022 | Mansoor ............ G06F 16/2358 |
| 2022/0188079 | A1* | 6/2022 | Kohisseri ................ G06N 5/04 |
| 2022/0237892 | A1 | 7/2022 | Yang |
| 2022/0405775 | A1 | 12/2022 | Siebel |
| 2022/0414382 | A1* | 12/2022 | Xiong .................. G06V 10/764 |
| 2024/0362495 | A1* | 10/2024 | Farrahi Moghaddam ................... G06N 3/063 |

OTHER PUBLICATIONS

Te, Y. F. (Jul. 2018). Predicting the financial growth of small and medium-sized enterprises using web mining (Doctoral dissertation, ETH Zurich). (Year: 2018).*

Djordjevic, D., & Ghani, R. (Dec. 2010). Graphics classification for enterprise knowledge management. In 2010 IEEE International Conference on Data Mining Workshops (pp. 562-569). IEEE. (Year: 2010).*

* cited by examiner

*Primary Examiner* — Michael J Huntley
*Assistant Examiner* — Maggie Thanh Maido
(74) *Attorney, Agent, or Firm* — Caldwell Intellectual Property Law

(57) ABSTRACT

The present disclosure is generally related to an apparatus and a method receiving system data, classifying the system data to a concern category, and generating, at least a tailored recommendation as a function of the classified system data. Further, the method may include generating a functional model as a function of the at least a tailored recommendation, transmitting the at least a tailored recommendation and the function model to a display, and displaying the at least a tailored recommendation and the functional model as a geometrical depiction.

20 Claims, 8 Drawing Sheets

METHOD AND AN APPARATUS FOR FUNCTIONAL MODEL GENERATION

FIELD OF THE INVENTION

The present invention generally relates to the field of artificial intelligence. In particular, the present invention is directed to a method and an apparatus for functional model generation.

BACKGROUND

As a system becomes larger and more complex, inter-element relationships are increasingly challenging to track. This makes it difficult, in turn, to model such relationships and generate useful outputs.

SUMMARY OF THE DISCLOSURE

In an aspect an apparatus for determining tailored recommendations for an enterprise, the apparatus comprising: at least a processor; and a memory communicatively connected to the at least processor, the memory containing instructions configuring the at least processor to receive enterprise data, classify the enterprise data to a concern category, and generate at least a tailored recommendation as a function of the classified enterprise data. Further, the processor may be configured to generate a functional model as a function of the at least a tailored recommendation, transmit the at least a tailored recommendation and the function model to a display, and display the at least a tailored recommendation and the functional model as a geometrical depiction.

In another aspect a method for determining tailored recommendations for an enterprise, the method may include receiving, by a processor, enterprise data, classifying, by the processor, the enterprise data to a concern category, and generating, by the processor, at least a tailored recommendation as a function of the classified enterprise data. Further, the method may include generating, by the processor, a functional model as a function of the at least a tailored recommendation, transmitting, by the processor, the at least a tailored recommendation and the function model to a display, and displaying, by a display, the at least a tailored recommendation and the functional model as a geometrical depiction.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and method for determining tailored recommendations for an enterprise. In an embodiment, determining tailored recommendations for an enterprise may include utilizing a machine-learning process.

Figure 1:
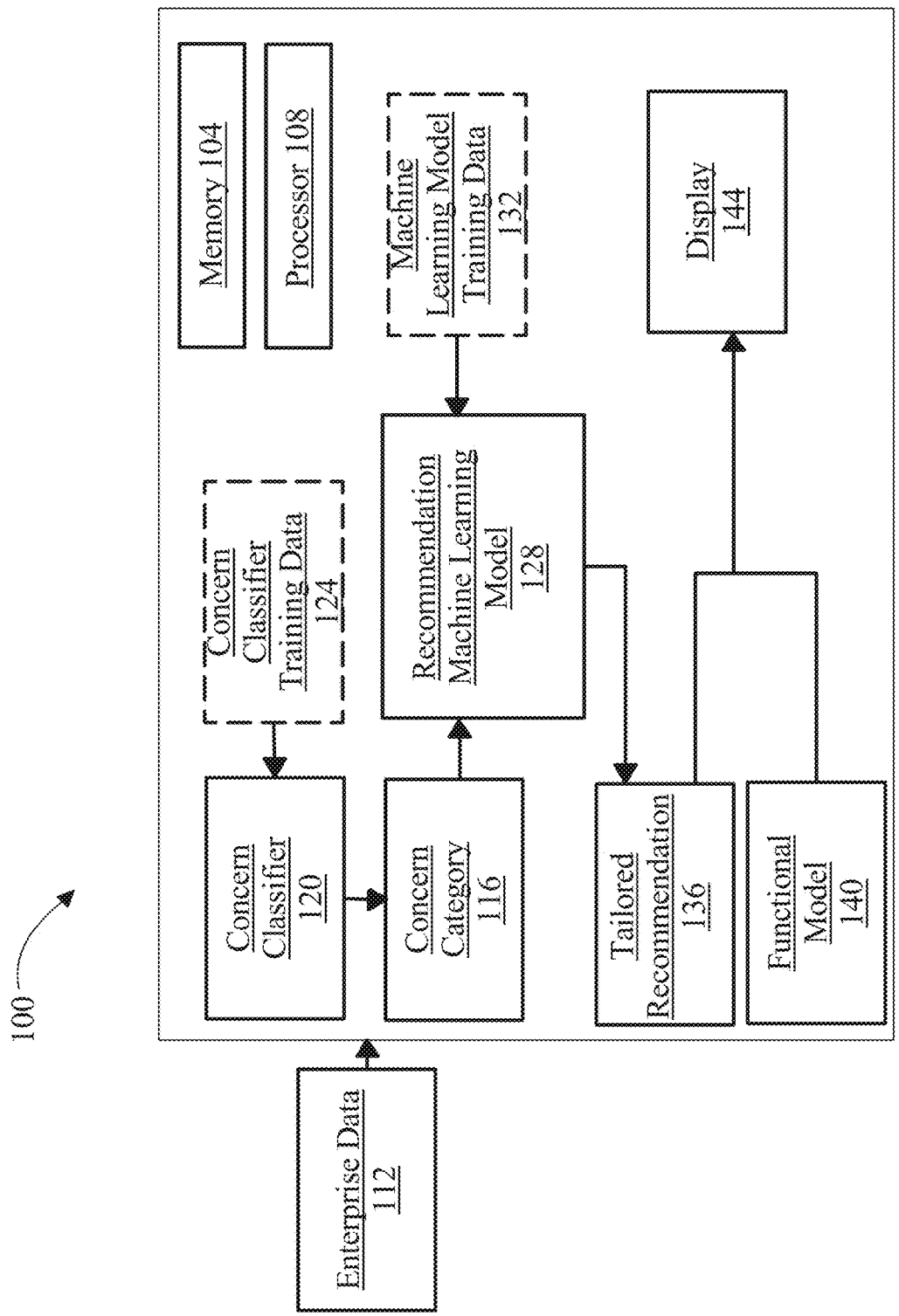
FIG. 1 is a block diagram of an exemplary embodiment of an apparatus for functional model generation.

Referring now to FIG. 1, an exemplary embodiment of an apparatus 100 for routine improvement for an entity is illustrated. Apparatus may include a memory. Apparatus may include a processor. Processor may include, without limitation, any processor described in this disclosure. Apparatus may include any apparatus as described in this disclosure, including without limitation a microcontroller, microprocessor, digital signal processor (DSP) and/or system on a chip (SoC) as described in this disclosure. Apparatus may include, be included in, and/or communicate with a mobile device such as a mobile telephone or smartphone. Apparatus may include a single apparatus operating independently, or may include two or more apparatus operating in concert, in parallel, sequentially or the like; two or more apparatus s may be included together in a single apparatus or in two or more apparatus s. Apparatus may interface or communicate with one or more additional devices as described below in further detail via a network interface device. Network interface device may be utilized for connecting apparatus to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two apparatus s, and any combinations thereof. A network may employ a wired and/or a wireless mode of communication. In general, any network topology may be used. Information (e.g., data, software etc.) may be communicated to and/or from a computer and/or an apparatus. Apparatus may include but is not limited to, for example, an apparatus or cluster of apparatus s in a first location and a second apparatus or cluster of apparatus s in a second location. Apparatus may include one or more apparatus s dedicated to data storage, security, distribution of traffic for load balancing, and the like. Apparatus may distribute one or more computing tasks as described below across a plurality of apparatus s of apparatus, which may operate in parallel, in series, redundantly, or in any other manner used for distribution of tasks or memory between apparatus. Apparatus may be implemented, as a non-limiting example, using a "shared nothing" architecture.

With continued reference to FIG. 1, apparatus 100 may be designed and/or configured to perform any method, method step, or sequence of method steps in any embodiment described in this disclosure, in any order and with any degree of repetition. For instance, apparatus 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 may receive enterprise data 112. As used in this disclosure, "enterprise data" is data associated with an enterprise of interest. In some embodiments, enterprise data 112 may include a user, or a company associated with a user. Enterprise data may include, for example, data describing the company's financial projections, data describing the company's business model, data describing company employees, data describing the user, and data describing other entities in the company's industry. In some embodiments, enterprise data 112 may include financial data, such as current financial data associated with the entity. Financial data may include, for example, revenue of a company, profit of a company, and income of a user. Financial data may be received, for example, from a company's internal auditing process or from a public company's financial reports. In some embodiments, enterprise data 112 may be collected via direct user textile input, a web crawler, speech recognition, or the like. As a non-limiting example, enterprise data 112 may include an analysis of user speech. Speech data may be collected, for example, by prompting a user to discuss an entity and recording user speech, or by searching online (e.g., social media sites) for spoken discussions of an entity. User speech may be analyzed to determine, for example, the level of excitement or confidence the user feels about the company. Machine learning may be used to analyze user speech. Machine learning model may be any suitable machine learning model as mentioned in this disclosure. A machine learning model may be trained on historical speech samples tagged with, for example, confidence and excitement ratings. A machine learning model may use a speech recording as an input and may output confidence and excitement ratings.

With continued reference to FIG. 1, in some embodiments, apparatus 100 may include a language processing module to process enterprise data 112. A language processing module may include any hardware and/or software module. A language processing module may be configured to extract, from one or more documents, one or more words.

One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, a language processing module may operate to produce a language processing model. A language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to 1, a language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating a language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, a language processing module may use a corpus of documents to generate associations between language elements in a language processing module, and diagnostic engine may then use such associations to analyze words extracted from one or more documents and determine that the one or more documents indicate significance of a category. In an embodiment, language module and/or apparatus 100 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into apparatus 100. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York. In some embodiments, apparatus 100 may determine one or more characters, symbols, strings, phrases, and the like of user input. Apparatus 100 may determine one or more characters, symbols, strings, phrases, and the like using a language processing module as described above. Apparatus 100 may compare determined text of user input and/or other input through comparing received input, such as user input, to one or more databases. Databases may include, without limitation, warehouse management systems, websites, and the like.

With continued reference to FIG. 1, enterprise data 112 may include basic information, such as and without limitations, life span, industry, market details, sectors, operation details, and the like. In some embodiments, enterprise data 112 may be received through an input device. In some instances, input device may be apparatus 100. In some instances, input device may include a remote device. In instances where enterprise data 112 is input into a remote input device, remote device may transmit enterprise data 112 across a wireless connection. In some embodiments, wireless connection may be any suitable connection (e. g., radio, cellular). In some instances, input device may include a computer, laptop, smart phone, tablet, or things of the like. In some instances, enterprise data 112 may be stored in a data store and associated with an enterprise account. It should be noted that data store may be accessed by any input device, using authorization credentials associated with enterprise data 112. In some instances, enterprise data 112 may be created and stored via a laptop and accessed from tablet, using authorization credentials.

With continued reference to FIG. 1, apparatus 100 may receive enterprise data 112 at processor 108. In some embodiments, processor 108 may have formatting requirements to ensure efficient processing and output of data from processor 108. Keeping that in mind, apparatus 100 may utilize processor 108 to perform pre-processing on enterprise data 112. It should be noted that processor 108 may perform pre-processing for any data input to apparatus 100. Methods of pre-processing may include interpolation processes as discussed in more detail below.

Still referring to FIG. 1, processor 108 may use interpolation and/or up sampling methods to process enterprise data 112. For instance, where authentication credentials include image data, processor 108 may convert a low pixel count image into a desired number of pixels need to for input into an image classifier; as a non-limiting example, an image classifier may have a number of inputs into which pixels are input, and thus may require either increasing or decreasing the number of pixels in an image to be input and/or used for training image classifier, where interpolation may be used to increase to a required number of pixels. As a non-limiting example, a low pixel count image may have 100 pixels, however a number of pixels needed for an image classifier may be 128. Processor 108 may interpolate the low pixel count image to convert the 100 pixels into 128 pixels so that a resultant image may be input into an image classifier. It should be noted that image classifier may be any classifier as described in this disclosure. It should also be noted that one of ordinary skill in the art, upon reading this disclosure, would know the various methods to interpolate a low pixel count image to a desired number of pixels required by an image classifier. In some instances, a set of interpolation rules may be trained by sets of highly detailed images and images that may have been down sampled to smaller numbers of pixels, for instance and without limitation as described below, and a neural network or other machine learning model that is trained using the training sets of highly detailed images to predict interpolated pixel values in a facial picture context. As a non-limiting example, a sample picture with sample-expanded pixels (e.g., pixels added between the original pixels) may be input to a neural network or machine-learning model and output a pseudo replica sample-picture with dummy values assigned to pixels between the original pixels based on a set of interpolation rules. In some instances, image classifier and/or another machine-learning model may have a set of interpolation rules trained by sets of highly detailed images and images that have been down sampled to smaller numbers of pixels, and a neural network or other machine learning model that is trained using those examples to predict interpolated pixel values in a facial picture context. I.e., you run the picture with sample-expanded pixels (the ones added between the original pixels, with dummy values) through this neural network or model and it fills in values to replace the dummy values based on the rules.

Still referring to FIG. 1, processor 108 may utilize sample expander methods, a low-pass filter, or both. As used in this disclosure, a "low-pass filter" is a low-pass filter is a filter that passes signals with a frequency lower than a selected cutoff frequency and attenuates signals with frequencies higher than the cutoff frequency. The exact frequency response of the filter depends on the filter design. In some embodiments, processor 108 may use luma or chroma averaging to fill in pixels in between original image pixels. Processor 108 may down-sample image data to a lower number of pixels to input into an image classifier. As a non-limiting example, a high pixel count image may have 356 pixels, however a number of pixels needed for an image classifier may be 128. Processor 108 may down-sample the high pixel count image to convert the 356 pixels into 128 pixels so that a resultant image may be input into an image classifier.

In some embodiments, and with further reference to FIG. 1, processor may be configured to perform down sampling on data such as without limitation image data. For instance, and without limitation, where an image to be input to image classifier, and/or to be used in training examples, has more pixel than a number of inputs to such classifier. Down sampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Continuing to refer to FIG. 1, any training data described in this disclosure may include two or more sets of image quality-linked training data. "Image quality-linked" training data, as described in this disclosure, is training data in which each training data element has a degree of image quality, according to any measure of image quality, matching a degree of image quality of each other training data element, where matching may include exact matching, falling within a given range of an element which may be predefined, or the like. For example, a first set of image quality-linked training data may include images having no or extremely low blurriness, while a second set of image quality-linked training data. In an embodiment, sets of image quality-linked training data may be used to train image quality-linked machine-learning processes, models, and/or classifiers as described in further detail below.

Referring still to FIG. 1, training data, images, and/or other elements of data suitable for inclusion in training data may be stored, without limitation, in an image database. Image database may include any data structure for ordered storage and retrieval of data, which may be implemented as a hardware or software module. Image database may be implemented, without limitation, as a relational database, a key-value retrieval datastore such as a NOSQL database, or any other format or structure for use as a datastore that a person skilled in the art would recognize as suitable upon review of the entirety of this disclosure. An image database may include a plurality of data entries and/or records corresponding to entity tests as described above. Data entries in an image database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in an image database may reflect categories, cohorts, and/or populations of data consistently with this disclosure. Image database may be located in memory 104 of apparatus 100 and/or on another device in and/or in communication apparatus 100.

Still referring to FIG. 1, an exemplary embodiment of an image database is illustrated. One or more tables in image database may include, without limitation, an image table, which may be used to store images, with links to origin points and/or other data stored in image database and/or used in training data as described in this disclosure. Image database may include an image quality table, where categorization of images according to image quality levels, for instance for purposes of use in image quality-linked training data, may be stored. Image database may include a demographic table; demographic table may include any demographic information concerning users from which images were captured, including without limitation age, sex, national origin, ethnicity, language, religious affiliation, and/or any other demographic categories suitable for use in demographically linked training data as described in this disclosure. Image database may include an anatomical feature table, which may store types of anatomical features, including links to diseases and/or conditions that such features represent, images in image table that depict such features, severity levels, mortality and/or morbidity rates, and/or degrees of acuteness of associated diseases, or the like. Persons skilled in the art, upon reviewing the entirety of this disclosure, will be aware of various alternative or additional data which may be stored in image database.

Still referring to FIG. 1, processor 108 may receive enterprise data 112 that may include authorization image data. Image data may include pixel data of varying range. In instances where authorization image data does not match stored pixel data, processor 108 may transform authorization image data to stored pixel data. In some embodiments, pre-processing enterprise data 112 may include processor 108 may compare entity profile image data to stored pixel data. In some instances, entity profile image data may be transformed from its original state. Processor 108 may compare original entity profile image data to stored pixel data. Entity profile image data may differ in pixel count, thus, only a percentage of pixel data may match up. As a non-limiting example, at least 90 percent of pixel data may match. It should be noted that a percent match may be at least 95 percent, at least 90 percent, at least 80 percent, or the like. Processor may flag any entity that sends enterprise data 112 that have less than the specified amount of pixel data matchup.

Still referring to FIG. 1, enterprise data 112 may be digital signatures. As a non-limiting example, entity may use a device capable of fingerprinting. In some instances, enterprise data 112 may be a digital fingerprint. In some embodiments, digital fingerprint may be a digital scan of entity finger, face, or any identifying feature. Digital fingerprint may be stored in a database and retrieved upon processor 108 receiving enterprise data 112 from entity. Digital fingerprint received from entity may be compared to a stored fingerprint associated with entity using methods described above. In some instances, digital fingerprint may be an image of an identifying feature. A certainty percentage threshold may be lower for an image of identifying feature in comparison to a digital fingerprint to account for confounding variables including but not limited to camera quality, formatting, transmission packet loss, or the like.

With continued reference to FIG. 1, processor 108 may receive an IP address associated with a known location of entity. Enterprise data 112 may include IP address. In some embodiments, IP address may be appended to any data packet containing enterprise data 112 data. In some instances, time elapsed during data transmission may be used to authenticate entity. As a non-limiting example, time elapsed may be the time it takes for a data packet to be transmitted between a computing device associated with entity and processor 108. In some embodiments, time elapsed may be the time it takes for a first data packet to be transmitted from a computing device associated with entity to processor 108 and a second data packet transmitted from processor 108 to entity. Processor 108 may authenticate entity as a function of time elapsed by comparing actual time elapsed to an expected time elapsed. Expected time elapsed may be calculated as function of network latency, expected data packet size, and the like. In instances of fraud attempts, processor 108 may determine that time elapsed is below a certainty percentage threshold as described above. As a non-limiting example, a spoof account may be located in a different location than entity. Therefore, data packet transmission may take more or less time than expected. Accordingly, processor 108 may flag spoof account as fraudulent. In some instances, a fraudulent verifier may use a proxy server to attempt to authenticate themselves. Data packet transmission may take more or less time than expected. Accordingly, processor 108 may flag fraudulent verifier as fraudulent. It should be noted that IP addresses associated with flagged accounts may be stored in a database to preserve computational resources if multiple fraudulent attempts come from the same account. As a non-limiting example, processor 108 may receive fraudulent enterprise data 112 data packet with a flagged IP address appended to the data packet. Processor 108 may compare the data packet to stored flagged IP addresses. If the IP address appended to the data packet matches a stored flagged IP address, processor 108 may not authenticate verifier. It should be noted that flagged IP addresses may be added manually by a user, a third-party, source, or both.

Still referring to FIG. 1, processor 108 may classify enterprise data 112 to a concern category 116. As used in this disclosure, a "concern category" is a grouping of operations based on a level of concern for an enterprise. As a non-limiting example, a concern category 116 may indicate that one team of an enterprise is underperforming while another is adequately performing. In some embodiments, concern category 116 may include predetermined categories. Concern categories may include threshold values that differentiate categories. For example, threshold values may differentiate between dangers, opportunity to improve, and strength categories. In some instances, concern categories 116 may be represented by fuzzy set, as described in further detail below. Threshold metrics may be determined by scoring enterprise data with numeric values ranging from 0 to 1, 0 to 10, 0 to 100, or any suitable range. Dangers may be the lowest scored category, indicating that the portion of enterprise data associated therewith may cause detriment to the enterprise. Opportunity may be a middle-scored category, indicating that the portion of enterprise data associated therewith may require improvement to become a strength, or would eventually enter the danger category after a period of time. Strength may be a high scored category, indicating the portion of enterprise data associated therewith may be a strength of the enterprise.

Still referring to FIG. 1, Still referring to FIG. 1, enterprise data 112 may be classified to concern category 116 using a machine learning model, such as a classifier 120, to organize the concern category classes. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifiers as described throughout this disclosure may be configured to output at least a datum that labels or otherwise identifies a set of data that are clustered together, found to be close under a distance metric as described below, or the like. For example, processor 108 may generate and train a concern category classifier 120 configured to receive token data enterprise data 112 and output concern category class. Processor 108 and/or another device may generate a classifier using a classification algorithm, defined as a processes whereby a processor 108 derives a classifier from training data. In some embodiments, concern category classifier training data 124 may include activities associated with a concern category class. In some embodiments, market data statistics may be derived from a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 108 may generate a web crawler to scrape statistics from a plurality of resource forums/websites. The web crawler may be seeded and/or trained with a reputable website, such as crypto.com, to begin the search. A web crawler may be generated by a processor 108. In some embodiments, the web crawler may be trained with information received from a user through user interface. In some embodiments, the web crawler may be configured to generate a web query. A web query may include search criteria received from a user. For example, a user may submit a plurality of websites for the web crawler to search to extract market data statistics from and correlate to enterprise data 112, such as aesthetics based on price, popularity, bid history search criteria, and the like. Additionally, the web crawler function may be configured to search for and/or detect one or more data patterns. A "data pattern" as used in this disclosure is any repeating forms of information. A data pattern may include repeating data statistics related to enterprise data 112. For example, users tend to be more active earlier in the week. In some embodiments, the web crawler may be configured to determine the relevancy of a data pattern. Relevancy may be determined by a relevancy score. A relevancy score may be automatically generated by a processor 108, received from a machine learning model, and/or received from the user. In some embodiments, a relevancy score may include a range of numerical values that may correspond to a relevancy strength of data received from a web crawler function. In some embodiments, relevancy score may be considered a unique ability identified by outlier cluster and may be described in further detail in U.S. patent application Ser. No. 18/141,296, entitled "SYSTEMS AND METHODS FOR DATA STRUCTURE GENERATION," the entirety of which is incorporated by reference. As used in this disclosure. An "outlier cluster" is an attribute cluster with an impact metric that differs substantially from a population average. In some embodiments, outlier cluster and enterprise data 112 may be classified to a concern category. In some embodiments, enterprise data 112 may be classified to multiple concern categories 116. In some instances, some concern categories may be more similar to outlier cluster. As a non-limiting example, enterprise data 112, concern categories 116. And outlier clusters may be represented as vectors. A degree of similarity may be determined as a function of a geometric relationship between vector representations. In some instances, a machine learning model may be utilized to determine which concern category 116 is most closely related to outlier cluster.

Still referring to FIG. 1, concern category classifier may use data to prioritize the order in which enterprise data 112 is scheduled. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, processor 108 may be configured to generate classifiers as described throughout this disclosure using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)÷P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 108 may then calculate a likelihood table by calculating probabilities of different data entries and classification labels. Processor 108 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 108 may be configured to generate classifiers as described throughout this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 3, 4]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, processor 108 may generate at least a tailored recommendation 136 as a function of classified enterprise data. As used in this disclosure, "tailored recommendation" is a suggestion specific to an enterprise's current state, that will improve efficiency of the enterprise. Enterprise data 112, classified enterprise data, or both may be input into a recommendation machine learning model 128. Recommendation machine learning model 128 may be any suitable machine learning model as described in this disclosure. Recommendation machine learning model 128 may be utilized to output at least a tailored recommendation 136. In some embodiments, machine learning model 128 may utilize enterprise data 112 as inputs. As a non-limiting example, enterprise data 112 may include historical operation data. Recommendation machine learning model 128 may then output at least a tailored recommendation 136 as a function enterprise data 112. In some instances, recommendation machine learning model 128 may be trained with training data 132. Training data 132 may be any suitable training data as used in this disclosure. In some embodiments, training data 132 may include historical enterprise data 112 correlated to historical tailored recommendations. In some embodiments, training data 132 may include previous iterations of recommendation machine learning model 128 that receives inputs of enterprise data 112 to output at least a tailored recommendation 136. In some embodiments, training data and/or machine learning models may be selected from one or more options based at least on a classification of a problem. For example, different classes of concerns and/or challenges may have different solutions, thus a different machine learning model and respective training data may be utilized.

Still referring to FIG. 1, it should be noted that inputs into recommendation machine learning model 128 may be preprocessed into a same data format before being input into recommendation machine learning model 128. As a non-limiting example, a first portion of enterprise data 112 may be in a first format and a second portion of enterprise data 112 may be in a second format. Processor 108 may convert the first format to the second format or vice versa. As a non-limiting example, first portion of enterprise data 112 may be represented in vector space and second portion of enterprise data 112 may be represented in polynomial space. In that instance, first portion of enterprise data 112 may be linearly transformed to polynomial space. In some embodiments, the first and second formats may be converted into a third, distinct, format.

Still referring to FIG. 1, at least a tailored recommendation 136 may include changes in work tendencies, budgeting, layoffs, promotions, restructuring, or things of the like based on enterprise data 112. As a non-limiting example, enterprise data 112 may include an entity's current operations structure. A finance team's operation may be classified to a "danger" concern category. Accordingly, at least a tailored recommendation 136 may include suggestions to improve the finance team's classification from "danger" to "opportunity." In some instances, at least a tailored recommendation may include laying off a percentage of the workforce within a certain team. At least a tailored recommendation 136 may take into account entity's current financial situation and a national/global economic climate. Additionally, at least a tailored recommendation 136 may take into account prioritization of tasks. Prioritization of tasks may be performed as described in further detail below.

Still referring to FIG. 1, processor 108 may determine at least an interface element as a function of the at least a tailored recommendation 136. In some embodiments, processor 108 may output one or more at least a tailored recommendations. One or more at least a tailored recommendations may be ranked as a function of importance to a particular entity. In some instances, a scoring function may be utilized to rank one or more tailored recommendations. Scoring function may be any scoring function as described in further detail below. In some embodiments, processor may determine that more than one at least a tailored recommendation is of a same priority. In some embodiments, more than one interface element may be selected as a function of priority.

Still referring to FIG. 1, processor 108 may utilize a scoring function may expressed as a risk function representing an "expected loss" of an algorithm relating inputs to outputs, where loss is computed as an error function representing a degree to which a prediction generated by the relation is incorrect when compared to a given input-output pair provided in training data. In some instances, training data may include at least a tailored recommendations correlated to at least an interface element. In some instances, training data may include at least a tailored recommendations provided by a third-party source. In some instances, third-party source may be tangentially associated with entity. As a non-limiting example, third-party source may be a separate entity that shares a demographic classification with the entity.

Still referring to FIG. 1, processor 108 may generate a functional model 140. As used in this disclosure, "functional model" is a structured representation of functions within a system. As a non-limiting example, generating a functional model may be as a function of the at least one tailored recommendation 136 and may include assessing a concern category 116 of each of the at least one tailored recommendations. At least one tailored recommendations 136 may be classified using a recommendation classifier. Recommendation classifier may be any suitable classifier as described herein. It should be noted that recommendation classifier may classify each recommendation to a team and/or operation of an enterprise. Advantageously, this may allow an enterprise to make widespread changes to multiple teams and/or operations simultaneously. As a non-limiting example, a finance team a human resources (HR) team may both be classified to a "danger" concern category. In some instances, finance team and HR team may have different recommendations. However, in some instances, finance team and HR team may have a same recommendation of layoff 6% of workforce. Therefore, finance and HR may be classified to a layoff recommendation category. Further, at least one tailored recommendation may be aggregated based on the classification. For example, when two tailored recommendations are classified to a single category, one of the tailored recommendations may be selected based on the frequency in the enterprise data for the functional model.

Still referring to FIG. 1, Still referring to FIG. 1, processor 108 may transmit at least a recommendation 136 and functional model 140 to display 144 via a wired connection and/or a wireless connection. Wired connection transmission may include direct connection between processor and display. In some instances, wired connection may include intermediate relays disposed on a transmission pathway. In some embodiments, data structure that includes at least a recommendation 136 and functional model 140 to be displayed may need to be pre-processed prior to display. As a non-limiting example, at least a recommendation 136 and functional model 140 data may have a dither applied. As used in this disclosure, "dither" is an applied form of noise used to randomize quantization error, preventing large-scale patterns such as color banding in images. In some instances, dithering may be performed at processor 108 prior to transmission. In another embodiment, dither may occur at another hardware portion of apparatus 100. Total transmission from processor 108 to display may take longer if at least a recommendation 136 and functional model 140 data is transmitted from processor 108 to another hardware unit, then to display 144 than if it were direct.

Still referring to FIG. 1, processor 108 may transmit at least a recommendation 136 and functional model 140 data to display 144 and receive a return signal. In some embodiments, return signal may contain a same number of packets as the initial transmission. In some embodiments, return signal may have a percent loss of data packets. Percent loss of data packets may be required to be below a threshold (e.g., 30%, 10%, 6%) to confirm transmission. In some instances, percent loss may be above a threshold percent loss. Processor 108 may resend at least a recommendation 136 and functional model 140 data signal upon determining that percent loss is above a threshold percent loss. In some embodiments, processor 108 may transmit an error signal to display 144 in response to determining that percent loss is above a percent loss threshold. It should be noted that error signal may include a substantially smaller packet count than at least a recommendation 136 and functional model 140 data signal. Advantageously, error signal may rarely experience transmission errors. In some embodiments, processor 108 may determine an additional error in transmitting error signal, using methods as described above.

Figure 2:
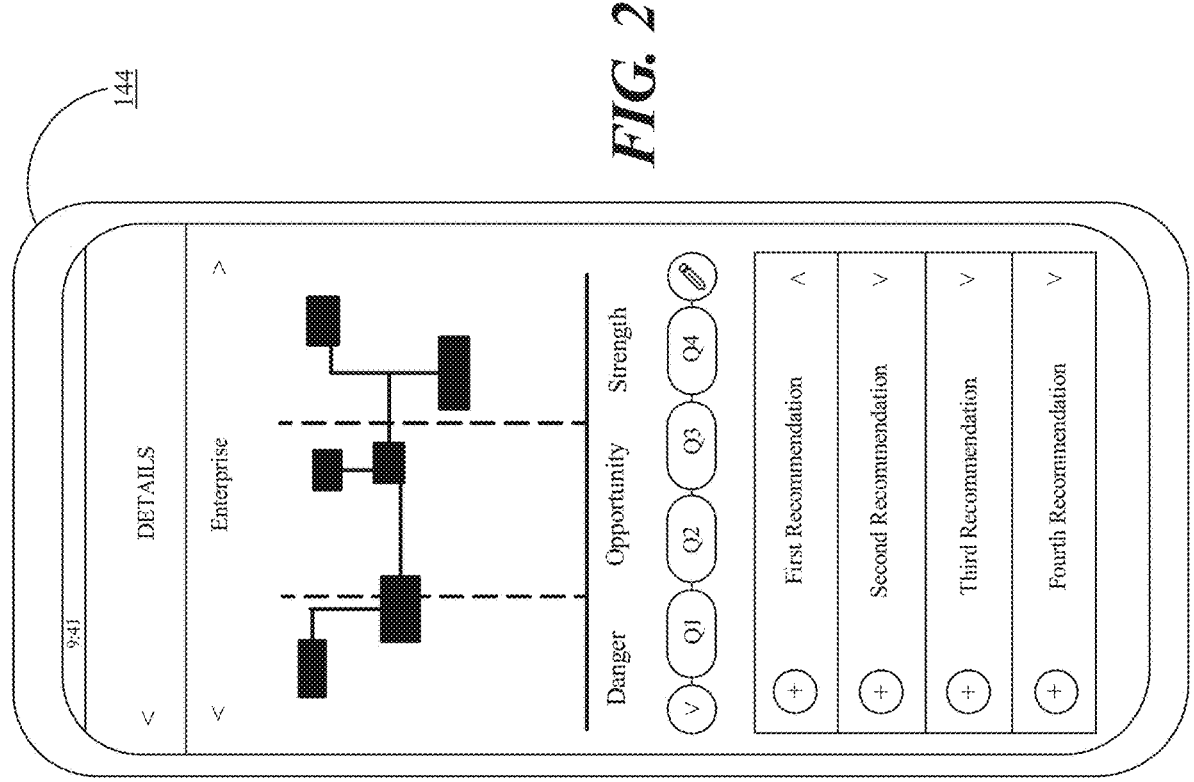
FIG. 2 is an illustrative embodiment of a user interface.

Now referring to FIG. 2, display 144 may display at least a recommendation 136 and functional model 140 as geometrical depiction. As used in this disclosure, a "geometrical depiction" is a graph, chart, or the like. As a non-limiting example, display 144 may display a pie chart depicting recommendations. In some embodiments, pie chart may be color coordinated. In some instances, concern categories 116 may be displayed on display 144. Concern categories 116 may be associated with colors. For example, "danger" may be red on display, "opportunity" may be yellow, and "strength" may be green. Display 144 may include one or more toggle options. Toggle options may be disposed on any portion of display 144. In some embodiments, toggle options may be associated with one or more "what-if" scenarios. As used in this disclosure, "what-if scenarios" are predicted outcomes when at least a recommendation is performed by enterprise. As a non-limiting example, if a finance team has a recommendation of promoting 3 people, to move from a "opportunity" category to a "strength" category. Display 144 may illustrate how effective promoting 3 people may be. In some instances, display 144 may illustrate how effective promoting 1 person may be. It should be noted that, in some instances, processor 108 may generate multiple recommendations. Each recommendation may have a toggle option to show each predicted outcome of performing the associated recommendation.

Still referring to FIG. 2, display 144 may illustrate functional model 140 as shown. As a non-limiting example, functional model may be displayed as and/or using different icons for each entity of an enterprise. In some instances, entities may be associated with one another, illustrated by connectivity lines. In some embodiments, functional model 140 may illustrate how each entity is classified into a concern category. In some instances, an entity may overlap in concern categories. Overlap may indicate that a current snapshot of entity indicates that they may be transitioning from one concern group to another. In some embodiments, a recommendation may be selected, and an entity may move from one concern category to another. In some embodiments, selection of a recommendation may modify the connectivity lines between entities. In some instances, an outlier entity may be highlighted with a different icon, color, or shading on display 144. Persons of ordinary skill in the art upon reading this disclosure would know the various ways that functional model may be displayed and modified.

Figure 3:
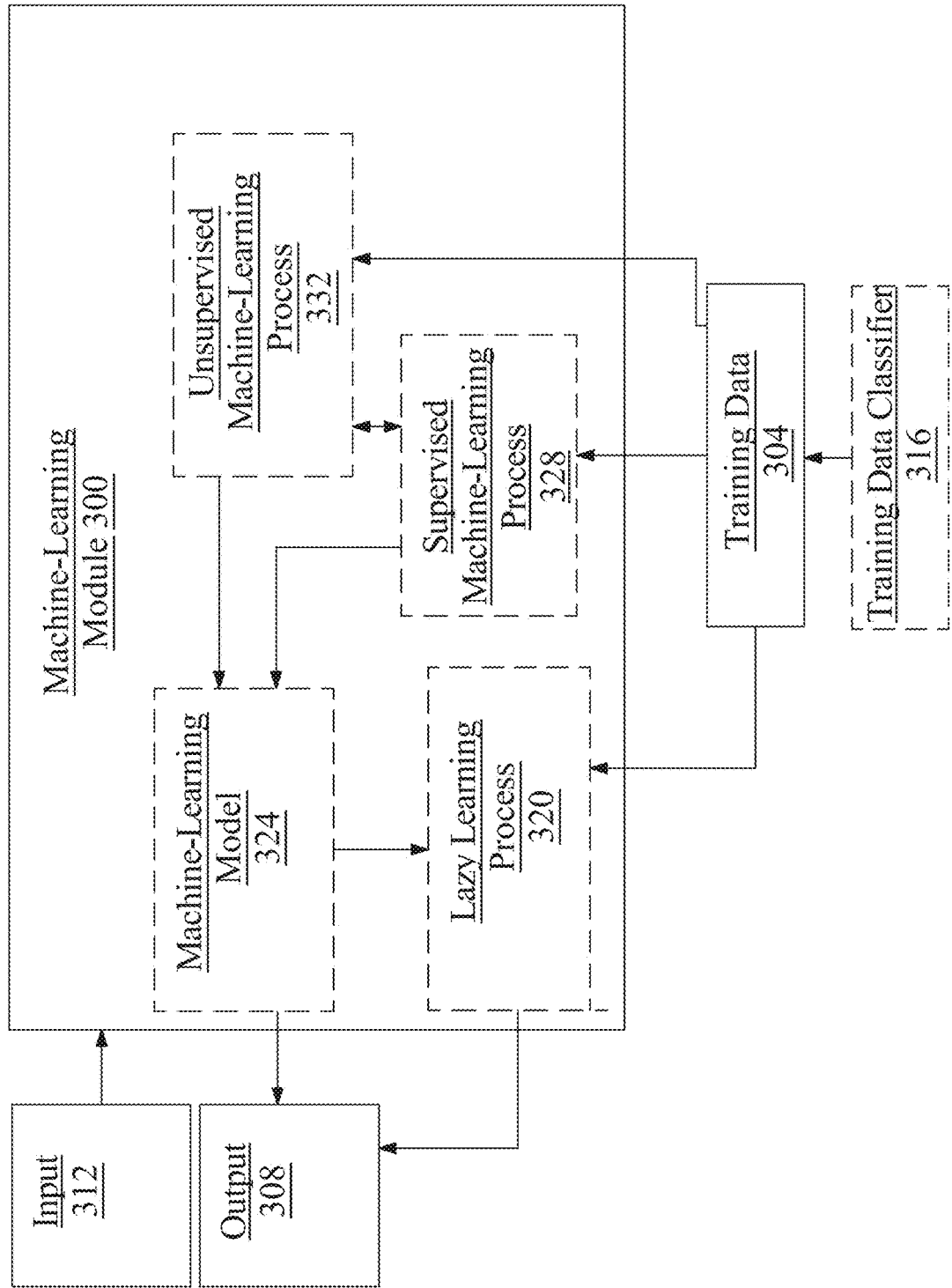
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to an age group, a socioeconomic class, race, ethnicity, or the like.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure and outputs and as described in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 4:
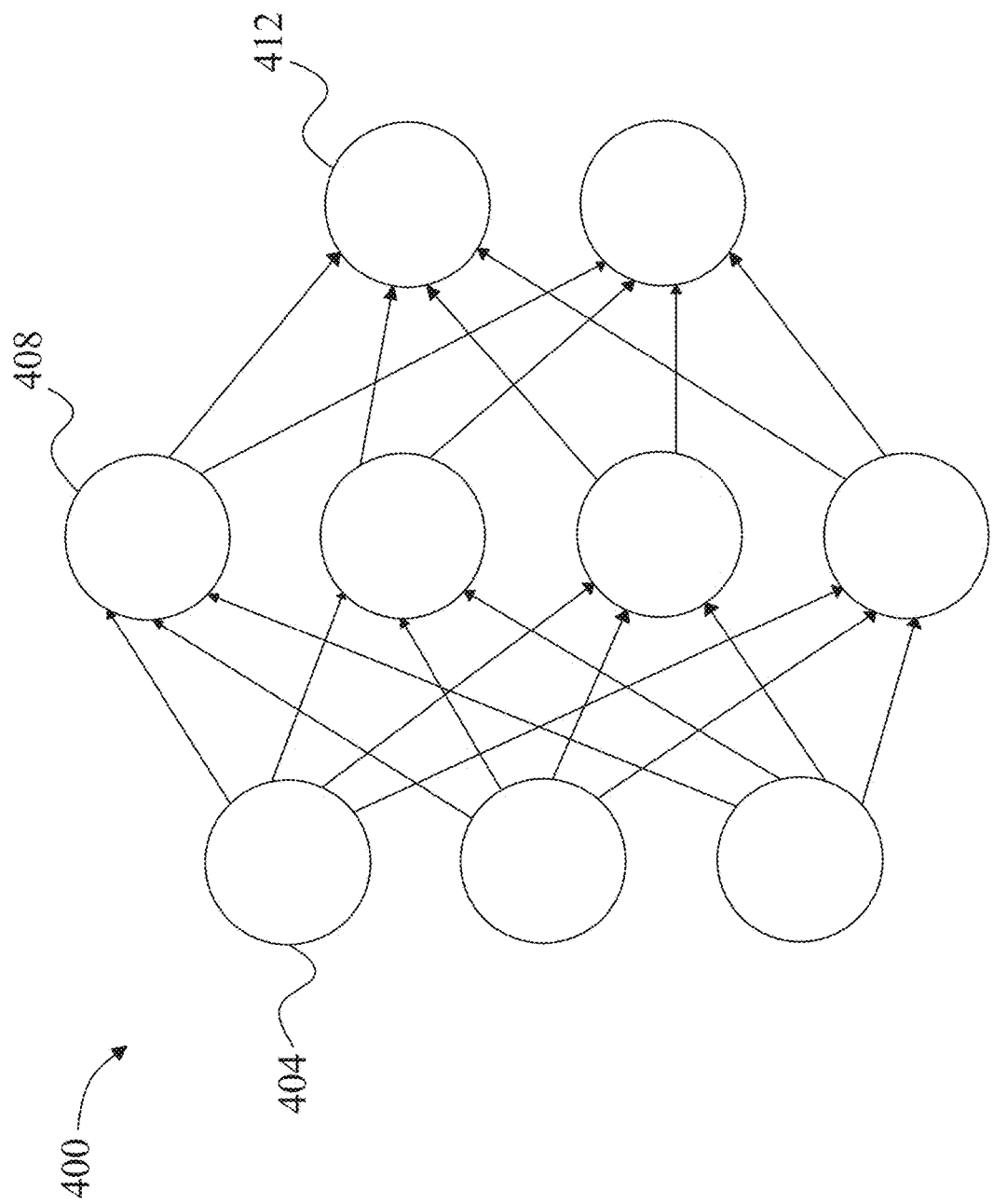
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
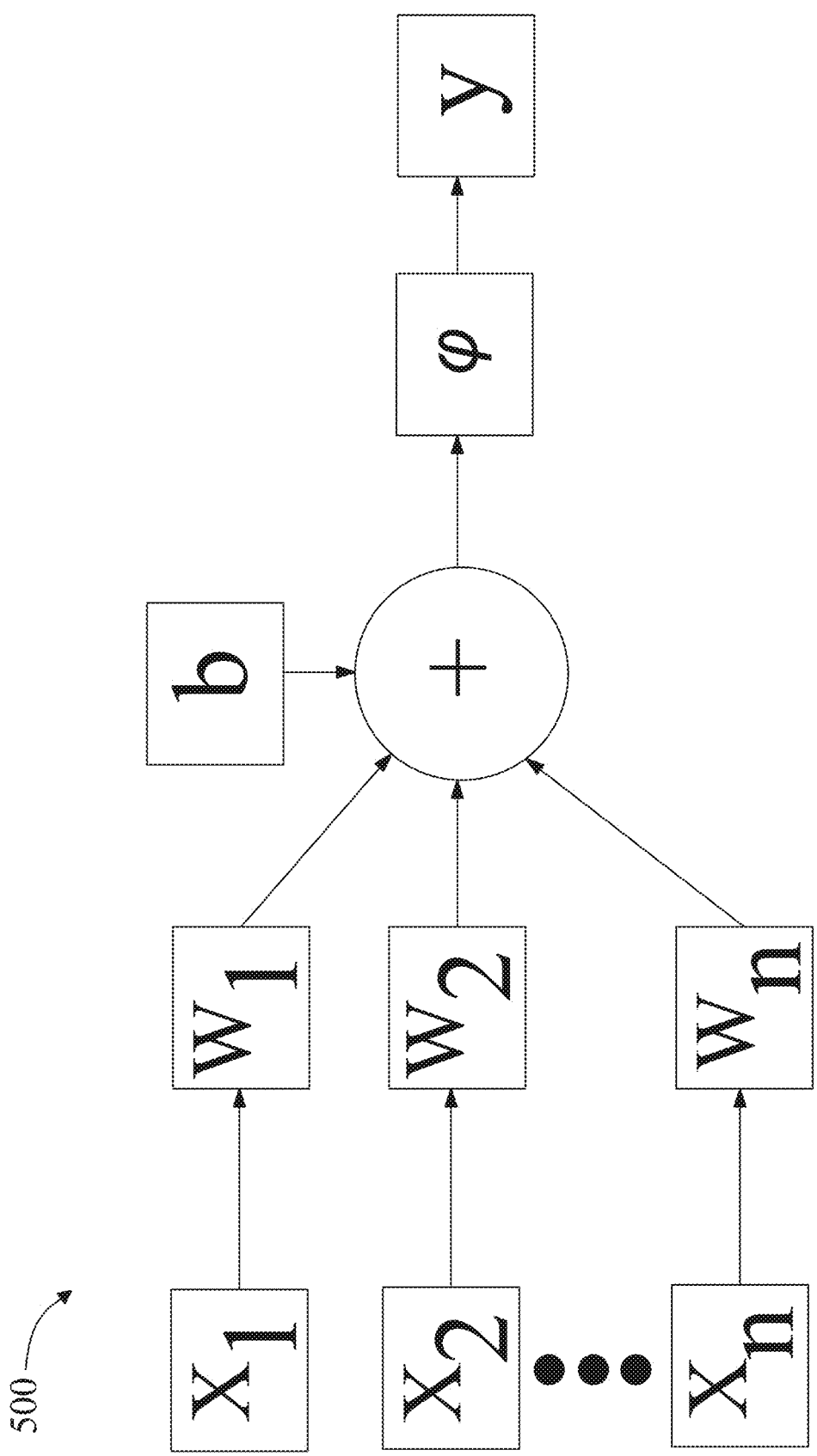
FIG. 5 is a diagram of an exemplary embodiment of a node of a neural network.

Referring now to FIG. 5, an exemplary embodiment of a node 500 of a neural network is illustrated. A node may include, without limitation a plurality of inputs x; that may receive numerical values from inputs to a neural network containing the node and/or from other nodes. Node may perform a weighted sum of inputs using weights w, that are multiplied by respective inputs xi. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight w, applied to an input x; may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w, may be determined by training a neural network using training data, which may be performed using any suitable process as described above.

Figure 6:
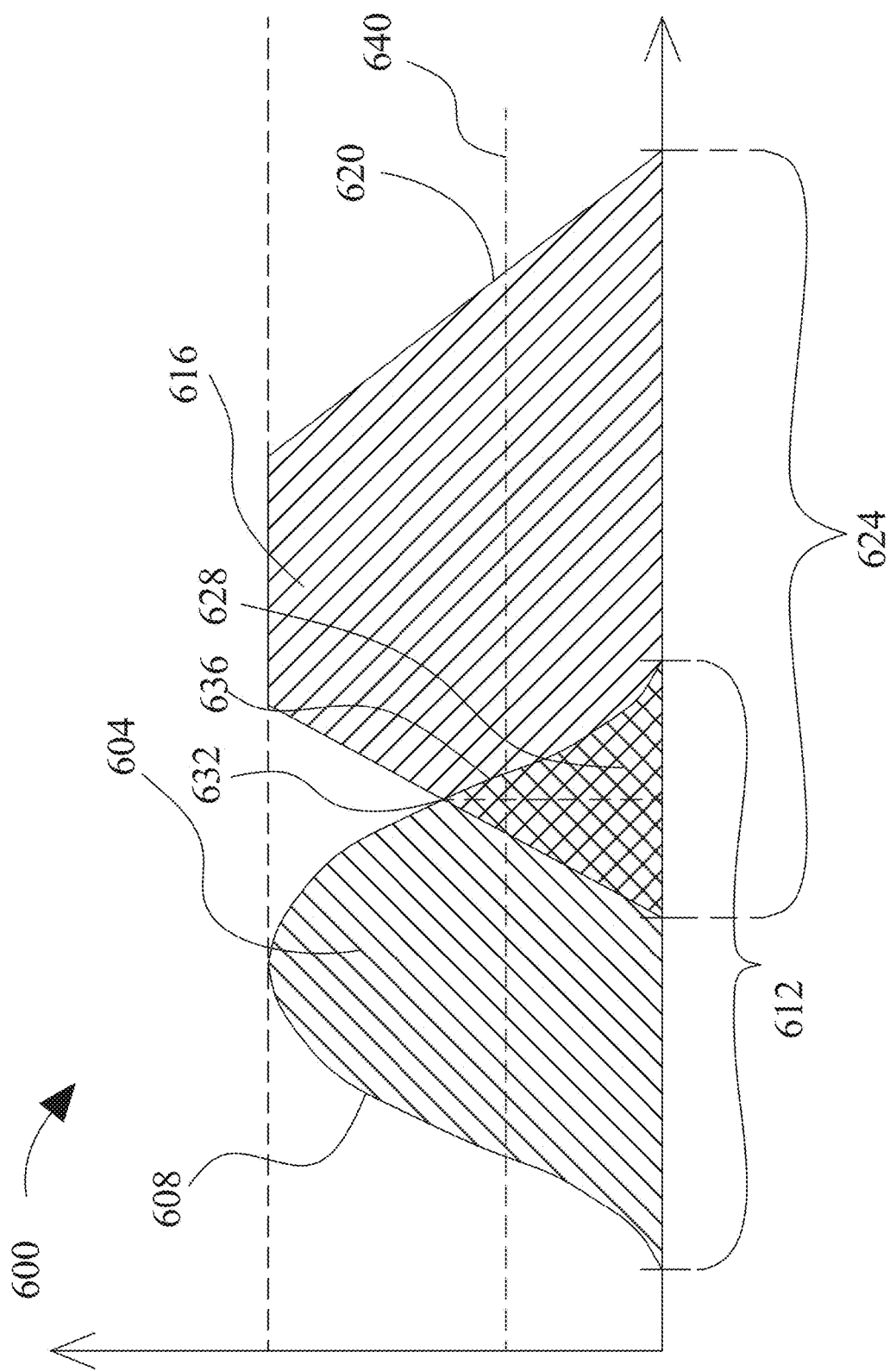
FIG. 6 is a graph illustrating an exemplary relationship between fuzzy sets.

Referring to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models, enterprise data 112, scale limiting factor 116, transport data, manufacturing data, organizational pattern data, such as without limitation of recommendation. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or enterprise data 112, tailored recommendation 136, and the like, such as without limitation recommendation categorization, for combination to occur as described above. Alternatively or additionally, each threshold may be tuned by a machine-learning and/or statistical process, for instance and without limitation as described in further detail below.

Further referring to FIG. 6, in an embodiment, a degree of match between fuzzy sets may be used to classify enterprise data 112 and tailored recommendation 136. For instance, if an entity has a fuzzy set matching enterprise data 112 and scale limiting factor 116 fuzzy set by having a degree of overlap exceeding a threshold, processor 108 may classify, enterprise data 112 and tailored recommendation 136 as belonging to the achievable categorization. Where multiple fuzzy matches are performed, degrees of match for each respective fuzzy set may be computed and aggregated through, for instance, addition, averaging, or the like, to determine an overall degree of match.

Still referring to FIG. 6, in an embodiment, an enterprise data 112 and tailored recommendation 136 may be compared to multiple recommendation categorization fuzzy sets. For instance, enterprise data 112 and tailored recommendation 136 may be represented by a fuzzy set that is compared to each of the multiple recommendation categorization fuzzy sets; and a degree of overlap exceeding a threshold between the enterprise data 112 and tailored recommendation 136 fuzzy set and any of the multiple recommendation categorization fuzzy sets may cause processor 108 to classify the enterprise data 112 and tailored recommendation 136 as belonging to achievable categorization. First enterprise data 112 categorization may have a first fuzzy set; second enterprise data 112 categorization may have a second fuzzy set. Processor 108, for example, may compare at least an interface element fuzzy set with each of recommendation categorization fuzzy set and in recommendation categorization fuzzy set, as described above, and classify enterprise data 112 class to either, both, or neither of recommendation categorization nor in recommendation categorization. Machine-learning methods as described throughout may, in a non-limiting example, generate coefficients used in fuzzy set equations as described above, such as without limitation x, c, and a of a Gaussian set as described above, as outputs of machine-learning methods. Likewise, enterprise data 112 may be used indirectly to determine a fuzzy set, as enterprise data 112 and fuzzy set may be derived from outputs of one or more machine-learning models that take the enterprise data 112 directly or indirectly as inputs.

Still referring to FIG. 6, a computing device may use a logic comparison program, such as, but not limited to, a fuzzy logic model to determine a recommendation response. An recommendation response may include, but is not limited to, very unlikely, unlikely, likely, and very likely, and the like; each such recommendation response may be represented as a value for a linguistic variable representing recommendation response or in other words a fuzzy set as described above that corresponds to a degree of matching as calculated using any statistical, machine-learning, or other method that may occur to a person skilled in the art upon reviewing the entirety of this disclosure. In other words, a given element of enterprise data 112 may have a first non-zero value for membership in a first linguistic variable value such as "very likely" and a second non-zero value for membership in a second linguistic variable value such as "very unlikely" In some embodiments, determining a recommendation categorization may include using a linear regression model. A linear regression model may include a machine learning model. A linear regression model may be trained using a machine learning process. A linear regression model may map statistics such as, but not limited to, quality of enterprise data 112 and tailored recommendation 136. In some embodiments, determining a recommendation of enterprise data 112 may include using a recommendation classification model. A recommendation classification model may be configured to input collected data and cluster data to a centroid based on, but not limited to, frequency of appearance, linguistic indicators of quality, and the like. Centroids may include scores assigned to them such that quality of enterprise data 112 may each be assigned a score. In some embodiments recommendation classification model may include a K-means clustering model. In some embodiments, recommendation classification model may include a particle swarm optimization model. In some embodiments, determining the recommendation of an enterprise data 112 and may include using a fuzzy inference engine. A fuzzy inference engine may be configured to map one or more enterprise data 112 and data elements using fuzzy logic. In some embodiments, enterprise data 112 may be arranged by a logic comparison program into recommendation arrangement. A "recommendation arrangement" as used in this disclosure is any grouping of objects and/or data based on skill level and/or output score. This step may be implemented as described above in FIGS. 1-5. Membership function coefficients and/or constants as described above may be tuned according to classification and/or clustering algorithms. For instance, and without limitation, a clustering algorithm may determine a Gaussian or other distribution of questions about a centroid corresponding to a given degree of matching level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 6, an inference engine may be implemented according to input and/or output membership functions and/or linguistic variables. For instance, a first linguistic variable may represent a first measurable value pertaining to image data, at least an activity, verifier location, network latency, such as a degree of matching of an element, while a second membership function may indicate a degree of in recommendation of a subject thereof, or another measurable value pertaining to enterprise data 112. Continuing the example, an output linguistic variable may represent, without limitation, a score value. An inference engine may combine rules, such as: "if image is likely this verifier, device is highly likely the verifier's device, location is likely correct, and network latency is likely correct, then verifier is highly likely to be identified"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Figure 7:
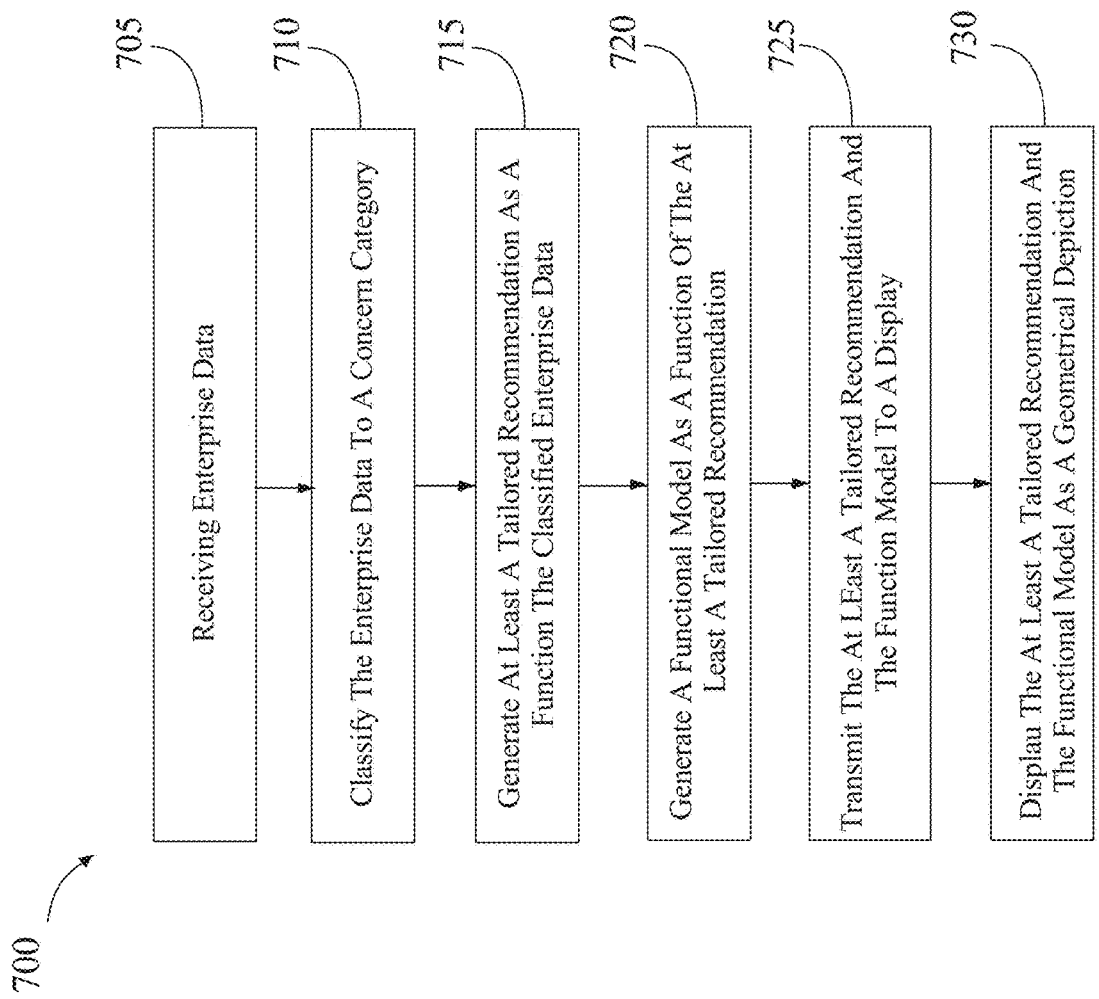
FIG. 7 is a flow diagram of an exemplary method for functional model generation.

Referring to FIG. 7, an exemplary method 700 for functional model generation. Method 700 includes a step 705, receiving, by a processor, enterprise data. In some embodiments, the entity data comprises image data. In some embodiments, the image data comprises processed image data, and wherein processing the image data comprises upsampling the image data to a desired pixel count. In some embodiments, the image data comprises processed image data, and wherein processing the image data comprises down sampling the image data to a desired pixel count. This may occur as described above in reference to FIGS. 1-6.

With continued reference to FIG. 7, method 700 includes a step 710 of classifying, by the processor, the enterprise data to a concern category. This may occur as described above in reference to FIGS. 1-6.

With continued reference to FIG. 7, method 700 includes a step 715 generating, by the processor, at least a tailored recommendation as a function of the classified enterprise data. This may occur as described above in reference to FIGS. 1-6.

With continued reference to FIG. 7, method 700 includes a step 720 of generating, by the processor, a functional model as a function of the at least a tailored recommendation. This may occur as described above in reference to FIGS. 1-6.

With continued reference to FIG. 7, method 700 includes a step 725 of transmitting, by the processor, the at least a tailored recommendation and the function model to a display. This may occur as described above in reference to FIG. 1-6.

With continued reference to FIG. 7, method 700 includes a step 730 of displaying, by a display, the at least a tailored recommendation and the functional model as a geometrical depiction. This may occur as described above in reference to FIG. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
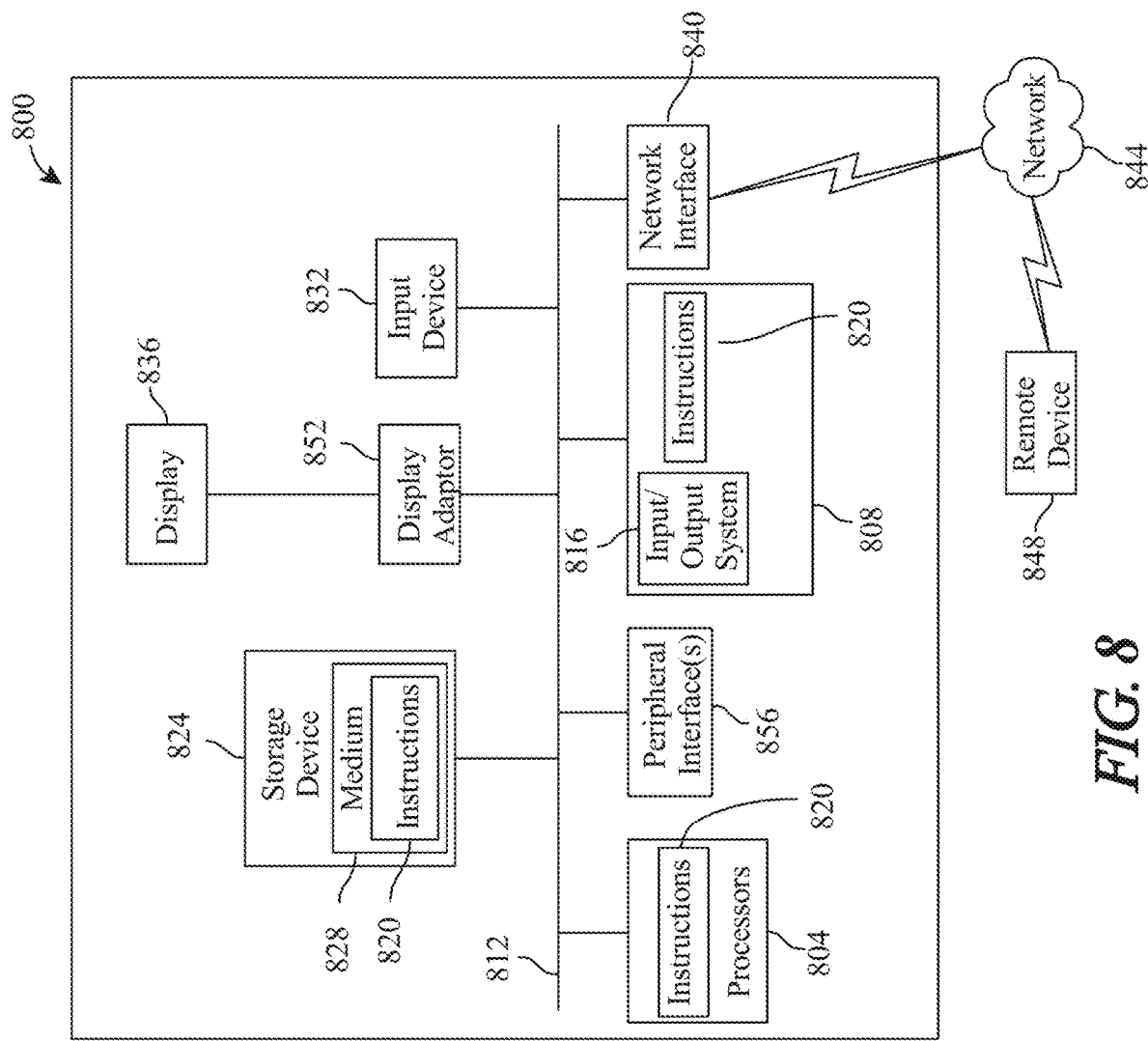
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

What is claimed is:

1. An apparatus for functional model generation, the apparatus comprising:
    at least a processor; and
    a memory communicatively connected to the at least processor, the memory containing instructions configuring the at least processor to:
        receive enterprise data regarding an enterprise having a plurality of entities, wherein:
            the enterprise data comprises image data; and
            receiving the enterprise data further comprises collecting the enterprise data using a web crawler;
        classify the enterprise data to a concern category, wherein classifying the enterprise data comprises classifying the image data to a concern category as a function of an image classifier;
        generate, using a recommendation machine learning model, at least a tailored recommendation as a function of the classified enterprise data, wherein generating at least a tailored recommendation comprises training a recommendation machine learning model using training data, wherein the training data comprises previous iterations of the recommendation machine learning model, wherein the previous iterations comprise classified enterprise data inputs and correlated tailored recommendation outputs;
        generate a functional model as a function of the at least a tailored recommendation;
        transmit the at least a tailored recommendation and the function model to a display;
        display the at least a tailored recommendation and the functional model as a geometrical depiction, wherein:
            the geometrical depiction includes a plurality of depictions, wherein each icon of the plurality of depictions depicts an entity of the plurality of entities; and
            displaying the geometrical depiction includes identifying that an entity of the plurality of entities is an outlier entity and highlighting a depiction of the plurality of depictions that is associated with the outlier entity; and
        select the at least a tailored recommendation, wherein a connectivity line between the plurality of entities is modified based on the selection.

2. The apparatus of claim 1, wherein receiving the enterprise data comprises receiving image data.

3. The apparatus of claim 2, wherein the image data comprises processed image data, and wherein processing the image data comprises upsampling the image data to a desired pixel count.

4. The apparatus of claim 1, wherein classifying the enterprise data further comprises utilizing a classifier machine-learning model.

5. The apparatus of claim 4, wherein utilizing the classifier machine-learning model comprises training the machine-learning model.

6. The apparatus of claim 1, wherein generating the at least a tailored recommendation comprises identifying a pattern of activity in enterprise data.

7. The apparatus of claim 6, wherein identifying the pattern of activity in enterprise data further comprises identifying an occurrence frequency of the pattern of activity.

8. The apparatus of claim 1, wherein generating a functional model comprises ranking the at least a tailored recommendation.

9. The apparatus of claim 8, wherein generating the function model further comprises utilizing a function model machine-learning model.

10. The apparatus of claim 1, wherein transmitting the at least a tailored recommendation and the functional model comprises satisfying a percent loss threshold.

11. A method for determining tailored recommendations for an enterprise, the method comprising:
receiving, by a processor, enterprise data regarding an enterprise having a plurality of entities, wherein:
the enterprise data comprises image data; and
receiving the enterprise data further comprises collecting the enterprise data using a webcrawler;
classifying, by the processor, the enterprise data to a concern category, wherein classifying the enterprise data comprises classifying the image data to a concern category as a function of an image classifier;
generating, by the processor, at least a tailored recommendation as a function of the classified enterprise data, wherein generating at least a tailored recommendation comprises training a recommendation machine learning model using training data, wherein the training data comprises previous iterations of the recommendation machine learning model, wherein the previous iterations comprise classified enterprise data inputs and correlated tailored recommendation outputs;
generating, by the processor, a functional model as a function of the at least a tailored recommendation;
transmitting, by the processor, the at least a tailored recommendation and the function model to a display;
displaying, by a display, the at least a tailored recommendation and the functional model as a geometrical depiction, wherein:
the geometrical depiction includes a plurality of depictions, wherein each icon of the plurality of depictions depicts an entity of the plurality of entities; and
displaying the geometrical depiction includes identifying that an entity of the plurality of entities is an outlier entity and highlighting a depiction of the plurality of depictions that is associated with the outlier entity; and
selecting the at least a tailored recommendation, wherein a connectivity line between the plurality of entities is modified based on the selection.

12. The method of claim 11, wherein receiving the enterprise data comprises receiving image data.

13. The method of claim 12, wherein receiving the image data comprises receiving processed image data, and wherein processing the image data comprises upsampling the image data to a desired pixel count.

14. The method of claim 11, wherein classifying the enterprise data further comprises utilizing a classifier machine-learning model.

15. The method of claim 14, wherein utilizing the classifier machine-learning model comprises training the machine-learning model.

16. The method of claim 11, wherein generating the at least a tailored recommendation comprises identifying a pattern of activity in enterprise data.

17. The method of claim 16, wherein identifying the pattern of activity in enterprise data further comprises identifying an occurrence frequency of the pattern of activity.

18. The method of claim 11, wherein generating a functional model comprises ranking the at least a tailored recommendation.

19. The method of claim 18, wherein generating the function model further comprises utilizing a function model machine-learning model.

20. The method of claim 11, wherein transmitting the at least a tailored recommendation and the functional model comprises satisfying a percent loss threshold.

* * * * *